United States Patent [19]

Bullecks

[11] Patent Number: 5,850,613
[45] Date of Patent: Dec. 15, 1998

[54] APPARATUS AND METHOD FOR HANDS-FREE OPERATION OF A RADIO MICROPHONE

[76] Inventor: David C. Bullecks, RD2, Box 1522, Buckfield, Me. 04220

[21] Appl. No.: 689,119

[22] Filed: Jul. 30, 1996

[51] Int. Cl.⁶ ...................................................... H04B 1/38
[52] U.S. Cl. ............................ 455/569; 455/90; 455/100; 455/344; 200/332
[58] Field of Search ............................ 455/569, 90, 100, 455/344, 128, 349, 350, 66, 347, 351; 381/91, 122, 168, 169; 379/430, 420, 449; 200/333, 332, 332.1

[56] References Cited

U.S. PATENT DOCUMENTS

| | | | |
|---|---|---|---|
| 3,586,798 | 6/1971 | Holmes | 200/52 R |
| 4,037,063 | 7/1977 | McDonald | 381/123 |
| 4,100,653 | 7/1978 | Sensabaugh | 24/3 J |
| 4,325,143 | 4/1982 | Kerr | 455/575 |
| 5,101,504 | 3/1992 | Leuz | 455/78 |
| 5,113,046 | 5/1992 | Hauk | 200/332 |
| 5,175,873 | 12/1992 | Goldenberg et al. | 455/351 |
| 5,249,235 | 9/1993 | Davis et al. | 381/91 |
| 5,268,965 | 12/1993 | Badie et al. | 381/91 |
| 5,535,437 | 7/1996 | Karl et al. | 455/90 |

*Primary Examiner*—Wellington Chin
*Assistant Examiner*—Lee Nguyen
*Attorney, Agent, or Firm*—Jones, Tullar and Cooper

[57] ABSTRACT

Apparatus for a radio microphone enables hands-free operation of the microphone when it is attached to a user's shirt, jacket or other article of clothing, for example. The apparatus preferably comprises a cover which is attached to the microphone and includes an integral actuating lever that is positioned to be actuated by movement of a user's head or chin. Police, fire or other emergency personnel at the scene of an emergency can utilize the cover to keep their hands free for other tasks during operation of the microphone, and this also avoids the possibility that the user will contaminate the microphone by contacting it with their hands.

17 Claims, 2 Drawing Sheets

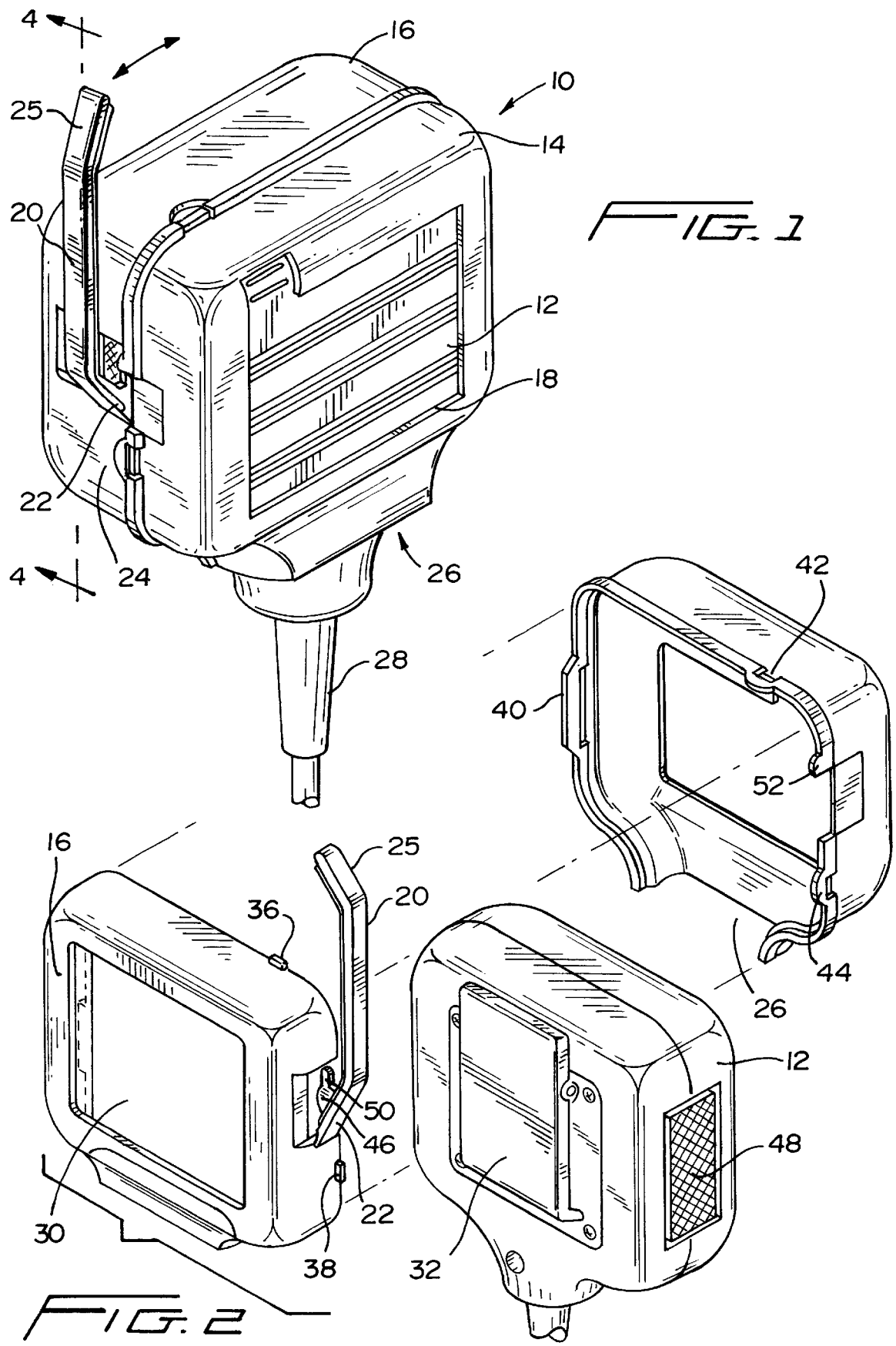

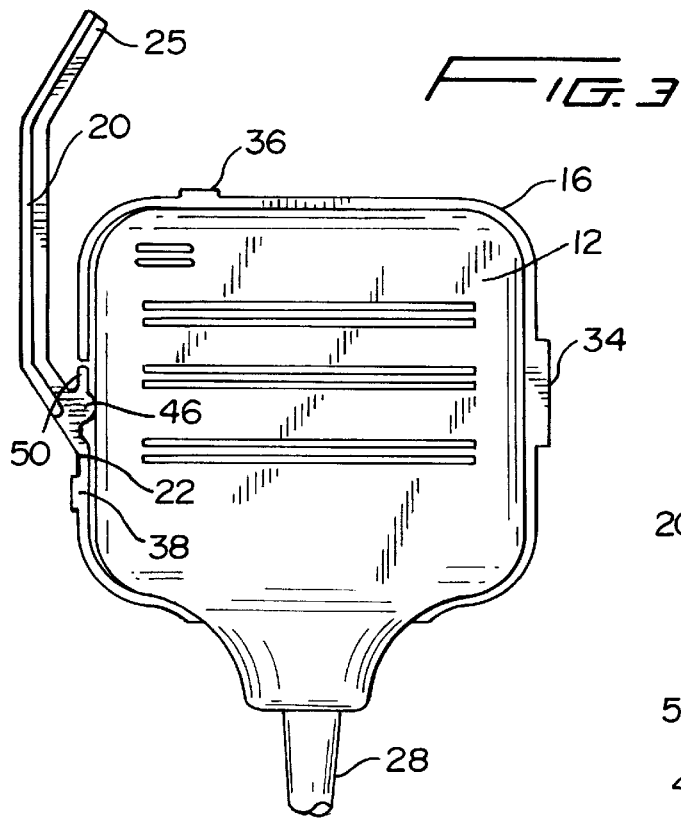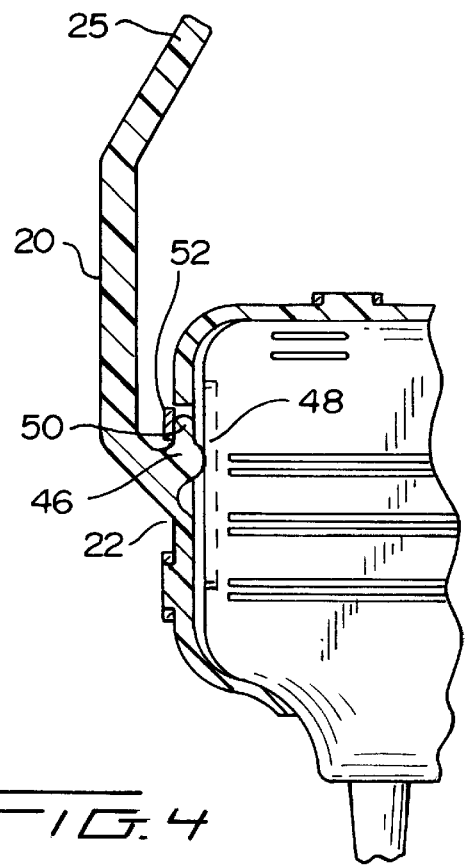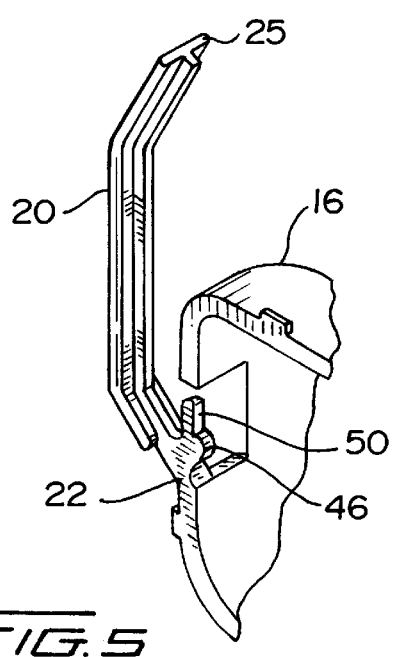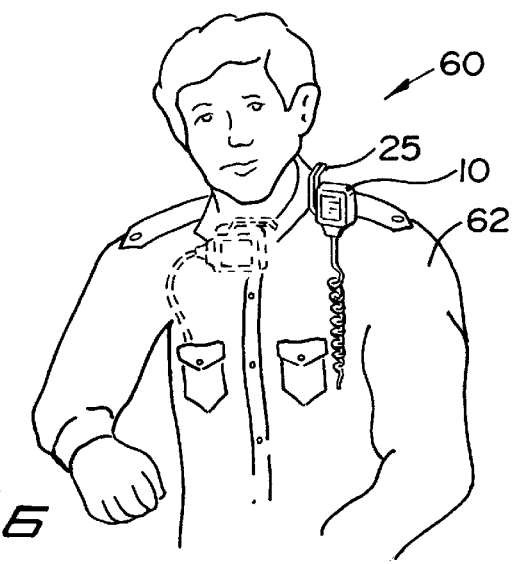

APPARATUS AND METHOD FOR HANDS-FREE OPERATION OF A RADIO MICROPHONE

BACKGROUND OF THE INVENTION

The present invention relates in general to an apparatus and method for a radio microphone which facilitates hands-free operation of the microphone actuator button.

Police, fire and other emergency personnel often employ portable two-way, body attached radios at the scene of an emergency to facilitate communication to and from the scene. Typically, the radios utilize a hand held combination microphone and speaker, known as a speaker mike. To operate the microphone, the user must actuate a push button with his or her thumb or finger. As a result, one of the problems associated with operation of the microphone at the scene of an emergency is that the user must have a free hand to operate it. Unfortunately, emergency personnel often literally have their hands full so that actuation of the radio microphone may necessitate putting down a piece of equipment or reducing patient care, for example.

Most speaker mikes on the market today offer a partial solution to this problem through the provision of a spring loaded clip which enables the speaker mike to be attached to a user's shirt pocket or collar, or other article of clothing, thus eliminating the need to hold it during actuation. However, this solution does not provide hands-free operation since the microphone's actuator button must still be pressed by the user's thumb or finger. Further, this solution does not address another problem. In particular, for the last few years, OSHA has been advocating barrier methods of protecting the health care industry from blood borne pathogens. As a result, it is now common practice for emergency personnel at an accident scene to wear surgical gloves to protect against this hazard. Unfortunately, any contaminants that are on the gloves can easily be transmitted to the speaker mike when it is actuated by the person's thumb or finger. Thus, to be completely safe, this requires that the speaker mike be decontaminated after the work at the emergency scene is completed.

SUMMARY OF THE INVENTION

The present invention solves the foregoing problems by providing a cover for a radio microphone, such as a speaker mike, which attaches to the microphone and permits a user to depress the microphone actuator button in a hands-free manner. More particularly, the microphone cover includes an actuator lever for actuating the microphone's control button which can be easily actuated by movement of a user's head or chin down or to one side when the microphone is clipped to the user's shirt, jacket or other article of clothing.

Preferably, the cover is comprised of two plastic pieces which are snapped together over the microphone by means of a plurality of locking tabs. The first, front cover piece includes a front opening for the microphone's receiver portion, while the second, rear cover piece includes a rear opening for the microphone's attachment clip. Molded integrally with the rear cover piece along one side is the actuator lever which includes an integral hinge member or portion and a button actuator tab. The hinge member enables the lever to be moved by an user's chin or head in such a manner that the actuator tab depresses the microphone's actuator button. When the user releases pressure on the lever, the hinge causes it to spring back to a nonactuation position.

In using the cover, a person attaches the microphone to his or her shirt, jacket, etc. in such a position that they can operate the actuator lever through a simple movement of the head or chin either down or to one side. This enables operation of the microphone in a completely hands-free manner, thereby allowing the user to have both hands available for other tasks during microphone actuation, and insuring that contaminants will not be transferred from the user's hands to the microphone.

BRIEF DESCRIPTION OF THE DRAWINGS

The features and the advantages of the present invention will become apparent from the following detailed description of a preferred embodiment thereof, taken in conjunction with the accompanying drawings, in which:

FIG. 1 is a front perspective view of a preferred embodiment of the microphone cover, showing the cover secured to a radio microphone;

FIG. 2 is an exploded perspective rear view of the preferred embodiment;

FIG. 3 is a front elevation of the preferred embodiment's rear cover piece illustrating its positioning on a microphone;

FIG. 4 is a partial view of a cross section through section 4—4 of FIG. 1;

FIG. 5 is an enlarged cut-away perspective view of a portion of the rear cover piece showing details of the actuator lever; and FIG. 6 is an illustration of the method of the present invention showing the cover assembled with a microphone and attached in two different positions to a user's shirt for actuation by their head or chin.

DETAILED DESCRIPTION OF THE PREFERRED EMBODIMENT

FIG. 1 illustrates a preferred embodiment of the present invention comprising a microphone cover 10 which is shown attached to a conventional button actuated radio microphone 12, such as a speaker mike. It will be understood that the cover 10 can be designed for use with any button actuated radio microphone, such as for example, but not limited to, those manufactured by Motorola Corporation. The cover 10 specifically comprises two pieces including a front cover piece 14 and a back cover piece 16. Both of the pieces 14 and 16 are preferably formed from molded plastic, such as for example black Delrin™, and are designed to be snapped together as discussed in greater detail below.

The front cover piece 14 includes an opening 18 for exposing the receiver/speaker portion of the microphone 12. The back cover piece 16 has an actuating lever 20 integrally formed therewith which connects to a body portion 24 of the rear cover piece 16 by means of a hinge 22 and includes a free end 25. The hinge 22 enables the lever 20 to pivot back and forth as illustrated, and is integrally molded with the back cover piece 16 in such a manner that the lever 20 is inherently biased toward the nonactuation position. An opening 26 is formed in the bottom portions of the front and rear cover pieces 14 and 16 for the microphone's electrical cord 28.

FIGS. 2–5 illustrate the details of the front and rear cover pieces 14 and 16. The rear cover piece 16 includes an opening 30 for exposing a spring loaded attachment clip 32 on the back of the microphone 12 that is used for attaching the same to any suitable location, such as a user's shirt pocket or collar, jacket, vest, harness, or other item of clothing, for example.

First, second and third lugs 34, 36 and 38 are integrally molded at spaced locations around the periphery of the rear cover piece 16. These cooperate with first, second and third corresponding slotted tabs 40, 42 and 44 that are integrally molded with the front cover piece 14 to enable the front and rear cover pieces 14 and 16 to be snapped together over the microphone 12. The first lug 34 and corresponding slotted tab 40 are larger than the other lug/slotted tab pairs to facilitate easy assembly of the cover 10. During assembly, a user first places the rear cover piece 16 over the microphone 12 and then inserts the first, large lug 34 on the front cover piece 14 into the first slotted tab 40. The user then presses the front and rear cover pieces 14 and 16 together which causes the second and third lugs 36 and 38 to snap into their corresponding slotted tabs 42 and 44, respectively.

Disposed at the lower end of the actuator lever 20 adjacent the hinge 22 is a microphone button actuator tab 46 which is positioned so that it will contact the microphone actuator button 48 when the adapter 10 is assembled on the microphone 12. When a user pushes on the free end 25 of the actuating lever 20 with their chin or head, the button actuator tab 46 depresses the microphone button 48, thereby actuating the microphone. To insure that the hinge 22 will not be accidentally broken by inadvertent movement of the actuating lever 20 in the wrong direction, a vertical ear 50 extends above the button actuator tab 46. The vertical ear 50 engages a tab 52 on the front cover piece 14 when this occurs, thereby preventing the hinge 22 from being bent back past a certain position.

FIG. 6 illustrates a person 60 using the cover 10 to actuate a microphone 12. As illustrated by the solid lines, the microphone 12 is attached to the person's shirt collar 62 in such a position that the person 60 can move their head to the left and move the free end 25 of the actuating lever 20 to the button actuating position. Alternatively, as illustrated by the dashed lines, the microphone 12 can be attached to the shirt 62 at a perpendicular angle so that the actuating lever 20 is positioned below the person's chin. In this position, the person 60 can push down on the actuating lever 20 with his or her chin.

Although the invention has been disclosed in terms of a preferred embodiment, it will be understood that numerous variations and modifications could be made thereto without departing from the scope of the invention as defined in the following claims. For example, although the preferred embodiment utilizes a two piece cover to facilitate easy assembly on a microphone, the cover can also be formed from a single molded plastic piece if desired. Furthermore, it is also possible to implement the present invention by incorporating the actuating lever 20 either with the microphone button 48 or in place thereof, thereby completely eliminating the need for the front and rear cover pieces 14 and 16.

What is claimed is:

1. Apparatus for enabling actuation of a radio microphone in a hands-free manner comprising:
   a) a cover for attachment to a radio microphone housing said cover comprising:
      1) a first cover piece including an opening in a first side thereof for exposing an attachment clip disposed on a microphone;
      2) a second cover piece; and
      3) means for attaching said first and second cover pieces together; and
   b) an actuating lever disposed on said cover, said actuating lever being positioned to depress an actuating button on a microphone housing when said cover is attached thereto, and having a free end positioned to be actuated by a user's head or chin when the microphone is secured to a user.

2. The apparatus of claim 1, wherein said means for attaching said first and second cover pieces further comprises a plurality of lugs formed on said first cover piece and a plurality of corresponding slotted tabs formed on said second cover piece for snapping said first and second cover pieces together.

3. The apparatus of claim 2, wherein said actuating lever is integrally formed with one of said cover pieces.

4. The apparatus of claim 3, wherein said actuating lever is attached to one of said cover pieces with an integral hinge.

5. The apparatus of claim 4, further including means for preventing said integral hinge from being bent past a certain position in one direction.

6. The apparatus of claim 1, wherein said actuating lever is intergrally formed with said cover, and said cover is formed from molded plastic.

7. The apparatus of claim 6, wherein said actuating lever is attached to said cover with an integral hinge.

8. The apparatus of claim 7, further including means for preventing said integral hinge from being bent past a certain position in one direction.

9. Apparatus for enabling actuation of a radio microphone in a hands-free manner comprising:
   a) a radio microphone;
   b) an attachment clip disposed on said microphone for attaching said microphone to a user's article of clothing near a user's head;
   c) an actuating lever for actuating said mircophone, said actuating lever being sized and positioned by a user's head or chin when said microphone is attached to the user's article of clothing; and
   d) a cover attached to said microphone, said cover including and opening in a first side for exposing said attachment clip, wherein said actuating lever is disposed on said cover and positioned to depress an actuating button on said microphone.

10. The apparatus of claim 9, wherein said cover further comprises:
    (1) a first cover piece;
    (2) a second cover piece; and
    (3) means for attaching said first and second cover pieces together.

11. The apparatus of claim 10, wherein said means for attaching said first and second cover pieces further comprises a plurality of lugs formed on said first cover piece and a plurality of corresponding slotted tabs formed on said second cover piece for snapping said first and second cover pieces together.

12. The apparatus of claim 11, wherein said actuating lever is integrally formed with one of said cover pieces.

13. The apparatus of claim 12, wherein said actuating lever is attached to one of said cover pieces with an integral hinge.

14. The apparatus of claim 13, further including means for preventing said integral hinge from being bent past a certain position in one direction.

15. A method for hands-free operation of a radio microphone comprising the steps of:
    a) providing a radio microphone having an attachment clip disposed thereon for attaching said microphone to a user's article of clothing near a user's head;
    b) providing a cover secured to said microphone having an actuating lever disposed thereon, said actuating lever being positioned and sized for actuation of said microphone by a user's head or chin when said microphone is attached to the user's article of clothing, said cover also including an opening in one side thereof for exposing said attachment clip;

c) attaching said microphone to a user's article of clothing; and d) actuating said microphone by moving said actuating lever with a user's head or chin.

16. The method of claim 15, wherein said step of providing a cover further comprises providing a cover including a first piece with said opening disposed therein, a second piece, and means for attaching said first and second pieces together.

17. The method of claim 16, wherein said step of providing a cover further comprises providing a molded plastic cover having said actuating lever integrally formed therewith.

* * * * *